US009402092B2

(12) United States Patent
Morotomi et al.

(10) Patent No.: US 9,402,092 B2
(45) Date of Patent: Jul. 26, 2016

(54) COMMUNICATION DEVICE, COMMUNICATION PROGRAM, AND COMMUNICATION METHOD

(71) Applicant: Hitachi Information & Telecommunication Engineering, Ltd., Yokohama-shi, Kanagawa-ken (JP)

(72) Inventors: Suzuka Morotomi, Yokohama (JP); Takuro Kaneko, Yokohama (JP); Naoya Kumada, Yokohama (JP); Yukio Yasumoto, Yokohama (JP); Yoshihiko Yagi, Yokohama (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 0 days.

(21) Appl. No.: 14/317,181

(22) Filed: Jun. 27, 2014

(65) Prior Publication Data

US 2015/0156524 A1 Jun. 4, 2015

(30) Foreign Application Priority Data

Dec. 4, 2013 (JP) ................................. 2013-251117

(51) Int. Cl.
*H04N 21/236* (2011.01)
*H04N 21/2383* (2011.01)
*H04N 21/242* (2011.01)
*H04N 21/8547* (2011.01)

(52) U.S. Cl.
CPC ......... *H04N 21/242* (2013.01); *H04N 21/2383* (2013.01); *H04N 21/8547* (2013.01); *H04N 21/23605* (2013.01)

(58) Field of Classification Search
CPC .......... H04N 21/242; H04N 21/23605; H04N 21/2383; H04N 21/236
See application file for complete search history.

(56) References Cited

U.S. PATENT DOCUMENTS

| 5,467,342 A * | 11/1995 | Logston et al. ............... 370/253 |
| 6,816,510 B1 * | 11/2004 | Banerjee ....................... 370/503 |
| 2004/0109519 A1 * | 6/2004 | Mizukami et al. ............ 375/362 |
| 2005/0036512 A1 * | 2/2005 | Loukianov ..................... 370/469 |
| 2008/0013726 A1 * | 1/2008 | Kuriya et al. .................. 380/210 |
| 2009/0201998 A1 * | 8/2009 | Komoriya ................ 375/240.25 |
| 2009/0288125 A1 * | 11/2009 | Morioka ........................ 725/110 |
| 2010/0135325 A1 * | 6/2010 | Kim et al. ..................... 370/474 |
| 2013/0058419 A1 * | 3/2013 | Ye et al. .................... 375/240.25 |
| 2014/0173136 A1 * | 6/2014 | Hazelet ...................... G06F 1/12 709/248 |
| 2015/0052571 A1 * | 2/2015 | Stokking et al. .............. 725/116 |

FOREIGN PATENT DOCUMENTS

JP 2000-92130 A 3/2000

* cited by examiner

*Primary Examiner* — Randy Flynn
(74) *Attorney, Agent, or Firm* — Crowell & Moring LLP (57) ABSTRACT

Task: To provide communication technology in which clock synchronization accuracy can be easily maintained, even on networks where packets can be easily lost.
Resolution Means: A communication device, comprising: a transmission unit that includes a flag processing unit that, upon receipt of one or a plurality of MPEG-2 TS packets, applies flag information to the packets at a predetermined interval in the forward reproduction direction of the packets, and a time stamp application unit that generates MPEG-2 TTS packets by applying a time stamp value calculated using a GPS clock to each of the one or a plurality of MPEG-2 TS packets, including the MPEG-2 TS packets having the flag information applied by the flag processing unit, and transmits the MPEG-2 TTS packets to a transmission path.

5 Claims, 9 Drawing Sheets

COMMUNICATION DEVICE, COMMUNICATION PROGRAM, AND COMMUNICATION METHOD

FIELD OF THE INVENTION

The present invention relates to communication technology. This application claims priority based on a Japanese Patent Application No. 2013-251117 filed on Dec. 4, 2013, the entire contents of which are incorporated by reference herein.

BACKGROUND OF THE INVENTION

Conventionally, in terrestrial digital broadcasting, a broadcast TS using MPEG-2 TS is sometimes used, and an OFDM modulator that converts the digital broadcast to radio waves requires a broadcast TS and a clock synchronized with the broadcast TS. Microwaves are used for transmissions from the broadcast station (master) to the transmitting station, and a constant rate signal is sent (broadcast TS and clock). On the other hand, when transmitting signals via a transmission path where jitter can occur comparatively easily, transmission of signals at a constant rate is not guaranteed, so a stable broadcast TS and clock cannot be transmitted. For this, synchronization is enabled by means such as adding time stamp information at the transmitter side, as well as providing a voltage controlled crystal oscillator (VCXO) at the receiver side.

The technology as described above includes clock fluctuation compensation technology in which, at the client which is the receiver side, the received packets are temporarily stored in a first buffer, a clock generated within the client and the time stamp data included in selected data packets are compared, the selected data packets are output from the first buffer and supplied to a second buffer at a time scheduled based on the results, and the data packets accumulated in the second buffer are supplied to the client's data demodulator. Patent Document 1 discloses this type of technology.

PRIOR ART DOCUMENTS

Patent Documents

Patent Document 1: Japanese Unexamined Patent Application Publication No. 2000-092130A

SUMMARY OF THE INVENTION

Problem to be Solved by the Invention

With the above technology, the clock is adjusted based on the buffer storage capacity (number of packets), and if packets are missing due to jitter or the like on the transmission path, the number of packets transmitted from the transmitter side and the number of packets received on the receiver side will be different, so the accuracy of clock synchronization may be reduced.

It is an object of the present invention to provide communication technology in which clock synchronization accuracy can be easily maintained, even on networks where packets can be easily lost.

Means to Solve the Problem

The present application includes a plurality of means to solve at least part of the above problem, but the following is given as an example. To solve the above problem, the communication device according to the present invention includes a transmission unit. The transmission unit includes a flag processing unit that, upon receipt of one or a plurality of MPEG-2 TS packets, applies flag information to the packets at a predetermined interval in the forward reproduction direction of the packets, and a time stamp application unit that generates MPEG-2 TTS (Time-stamped Transport Stream) packets by applying a time stamp value calculated using a GPS clock to each of the one or a plurality of MPEG-2 TS packets, including an MPEG-2 TS packet having flag information applied by the flag processing unit, and transmits the MPEG-2 TTS packets to a transmission path.

The communication device according to the present invention includes a receiving unit. The receiving unit includes a clock generator having an output clock frequency that can be variably adjusted, and a clock adjustment unit that acquires from among one or a plurality of MPEG-2 TS packets to which a time stamp value has been applied, packets to which a time stamp calculated using a GPS clock has been applied. If the packet includes predetermined flag information, the clock adjustment unit adjusts the clock frequency output by the clock generator in accordance with the difference between the time stamp value and a clock counter value output by the clock generator.

In addition, in the above communication device, when the value of the time stamp applied to a packet that includes the flag information is greater than the clock counter value output by the clock generator, the clock adjustment unit may increase the clock frequency output by the clock generator, and when the value of the time stamp is less than the clock counter value, the clock adjustment unit may reduce the clock frequency output by the clock generator.

The communication device according to the present invention includes a transmission unit that includes a flag processing unit that, upon receipt of one or a plurality of MPEG-2 TS packets, applies flag information to the packets at a predetermined interval in the forward reproduction direction of the packets, and a time stamp application unit that generates MPEG-2 TTS packets by applying a time stamp value calculated using a GPS clock to each of the one or a plurality of MPEG-2 TS packets, including the MPEG-2 TS packets having the flag information applied by the flag processing unit, and transmits the MPEG-2 TTS packets to a transmission path; and a receiving unit that includes a clock generator having an output clock frequency that can be variably adjusted, and a clock adjustment unit that acquires from among one or a plurality of MPEG-2 TTS packets, packets to which a time stamp calculated using a GPS clock has been applied, and if the packet includes the flag information, adjusts the clock frequency output by the clock generator in accordance with the difference between the time stamp value and the clock counter value output by the clock generator.

Furthermore, the above communication device may include a flag interval adjustment unit. When the frequency of adjustment of the clock frequency by the clock adjustment unit is greater than a predetermined number, the flag interval adjustment unit shortens the interval of applying the flag information by the flag processing unit and when the frequency of adjustment is less than a predetermined number, the flag interval adjustment unit lengthens the interval of applying the flag information by the flag processing unit.

The communication program according to the present invention causes a computer to function as a communication device. The computer is operated as a transmission control means and the communication program causes the transmission control means to execute, upon receipt of one or a plurality of MPEG-2 TS packets, a flag processing step of applying flag information to packets at a predetermined interval in the forward reproduction direction of the packets, and a time stamp application step of generating an MPEG-2 TTS packet by applying a time stamp value calculated using a GPS clock to each of the one or a plurality of MPEG-2 TS packets including an MPEG-2 TS packet having the flag information applied by the flag processing step, and transmitting the MPEG-2 TTS packet to a transmission path.

The communication program according to the present invention causes a computer to function as a communication device. The computer includes a clock generator having an output clock frequency that can be variably adjusted. The computer is operated as a receiving control means, and the communication program causes the receiving control means to execute a clock adjustment step of acquiring from among one or a plurality of MPEG-2 TS packets to which a time stamp value has been applied, packets to which a time stamp calculated using a GPS clock has been applied, and if the packet includes predetermined flag information, adjusting the clock frequency output by the clock generator in accordance with the difference between the time stamp value and the clock counter value output by the clock generator.

The communication method according to the present invention is a communication method using a computer, in which the computer executes a flag processing step of applying flag information to packets at a predetermined interval in the forward reproduction direction of the packets, upon receipt of one or a plurality of MPEG-2 TS packets; and a time stamp application step of generating an MPEG-2 TTS packet by applying a time stamp value calculated using a GPS clock to each of the one or a plurality of MPEG-2 TS packets including an MPEG-2 TS packet having the flag information applied by the flag processing step, and transmitting the MPEG-2 TTS packet to a transmission path.

The communication method according to the present invention is a communication method using a computer, wherein the computer executes a clock generation step that variably adjusts an output clock frequency, and a clock adjustment step of acquiring from among one or a plurality of MPEG-2 TS packets to which a time stamp value has been applied, packets to which a time stamp calculated using a GPS clock has been applied, and if the packet includes predetermined flag information, adjusting the clock frequency output by the clock generator in accordance with the difference between the time stamp value and the clock counter value output by the clock generator.

Problems, configurations, and effects apart from the above will become clear from the description of the embodiments below.

Effects of the Invention

According to the present invention, it is possible to provide communication technology in which clock synchronization accuracy can be easily maintained, even on networks where packets can be easily lost.

DETAILED DESCRIPTION OF THE INVENTION

The following is a description of the respective embodiments of a transmission device 10 and a receiving device 20 which are a communication device that applies a first embodiment of the present invention, with reference to the drawings. The communication device relates to a device for transmitting and receiving packets via a transmission path such as the internet or the like, where non-synchronization, jitter, and data loss can occur comparatively easily, using video information packets such as MPEG-2 transport stream (TS) which requires a particularly high transmission rate, internet protocol (IP), or the like.

Figure 1:
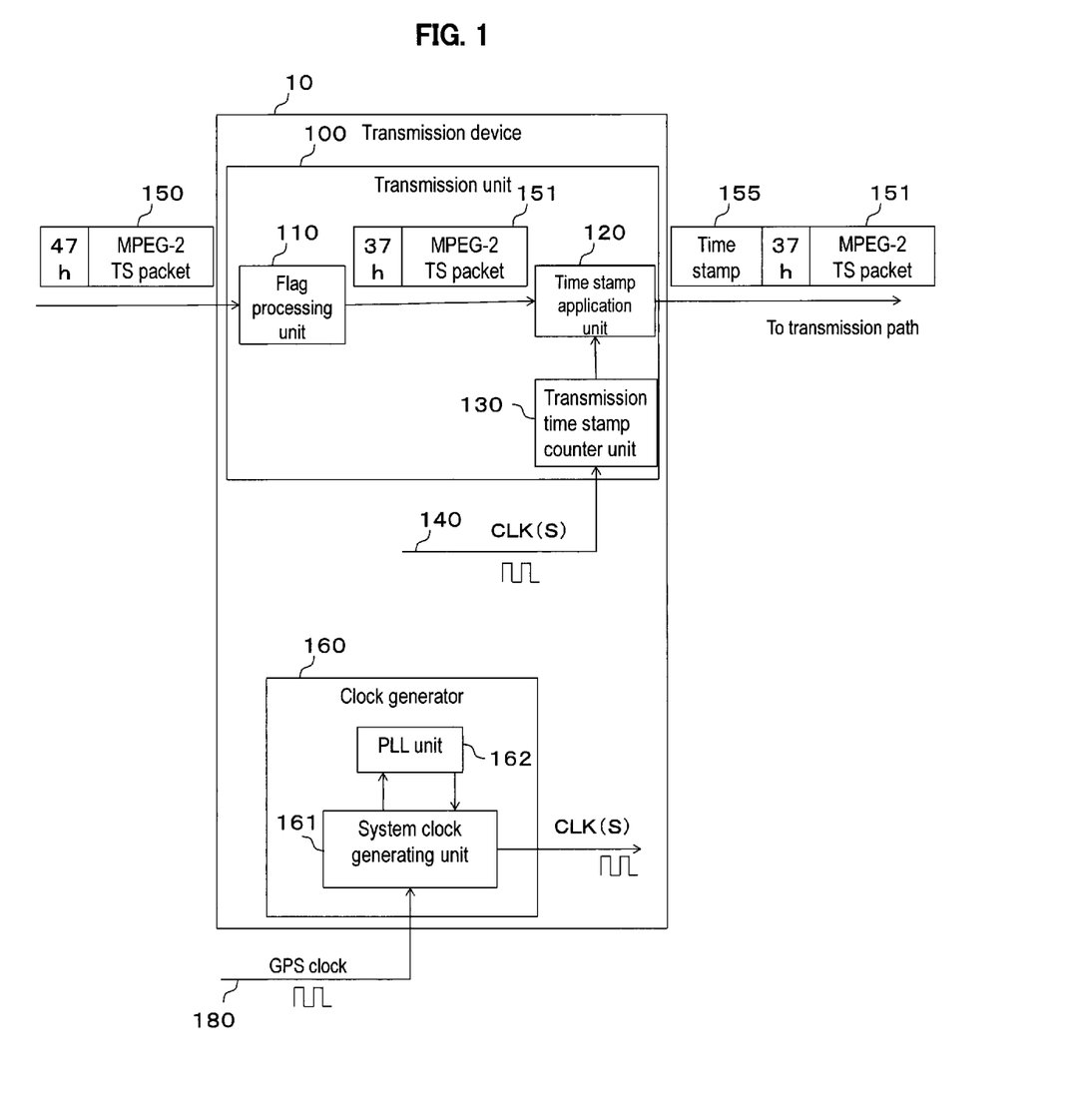
FIG. 1 is a block diagram of a transmission device according to a first embodiment of the present invention.

FIG. 1 is a block diagram of a transmission device 10 according to a first embodiment of the present invention. The transmission device 10 envisaged in the present embodiment includes a transmission unit 100 that transmits MPEG-2 TTS packets to a receiving device via a transmission path on which jitter could potentially occur, and a clock generator 160 that generates a clock (CLK(S)) that controls the operation of the transmission unit.

The clock generator 160 includes a system clock generating unit 161, and a PLL unit (for example, a PLL circuit) 162. Also, the system clock generating unit 161 uses a GPS clock 180 extracted from a GPS radio wave received from a GPS signal receiver and a system clock generating unit 161 generates a 27 MHz system clock using the PLL unit 162. The generated system clock CLK(S) is sent to the transmission unit 100, and used in the counter value of a transmission time stamp counter unit 130 that is described later.

The transmission unit 100 includes a flag processing unit 110, a time stamp application unit 120, and the transmission time stamp counter unit 130. The time stamp application unit 120 and the transmission time stamp counter unit 130 may also be referred to as the transmission time stamp generation unit. The transmission time stamp counter unit 130 generates a time stamp added to the MPEG-2 TTS packets to be transmitted using a system clock CLK(S) 140 generated by the system clock generating unit 161. The time stamp application unit 120 adds the time stamp to the MPEG-2 TS packets to configure the MPEG-2 TTS packets, and transmits them to the transmission path. Upon receipt of one or a plurality of MPEG-2 TS packets, the flag processing unit 110 applies flag information to the packets at a predetermined interval in the packet forward reproduction direction.

Specifically, the flag processing unit 110 changes the first byte of the MPEG-2 TS packet lead position as a flag from 47 h (fixed value in the packet front) to 37 h at a predetermined interval (for example, every 32 packets) in the forward reproduction direction of one or a plurality of MPEG-2 TS packets 150 input to the transmission unit 100, and transmits it to the time stamp generation unit as an MPEG-2 TS packet 151.

The time stamp application unit 120 adds the time stamp obtained from the transmission time stamp counter unit 130 to a predetermined position of the MPEG-2 TS packet 151 as a time stamp 155. The time stamp application unit 120 transmits the MPEG-2 TS packet to which the time stamp 155 has been added to the transmission path as an MPEG-2 TTS packet.

Figure 2:
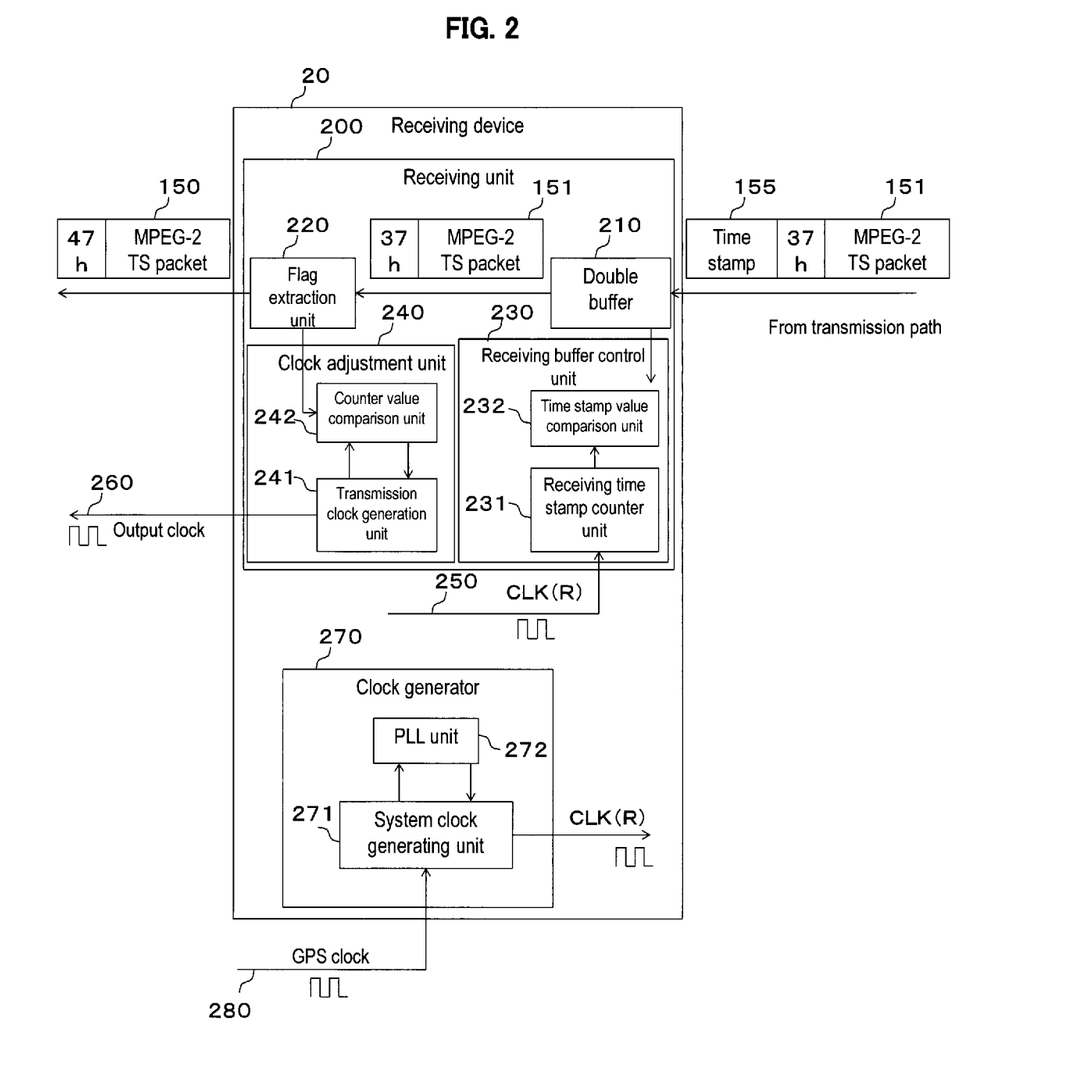
FIG. 2 is a block diagram of a receiving device according to the first embodiment of the present invention.

FIG. 2 is a block diagram of a receiving device 20 according to the first embodiment of the present invention. The receiving device 20 envisaged in the present embodiment includes a receiving unit 200 that receives MPEG-2 TTS packets from the transmission device 10 via a transmission path on which jitter could potentially occur, and a clock generator 270 that generates a clock (CLK(R)) for controlling the operation of the receiving unit.

The clock generator 270 includes a system clock generating unit 271, and a PLL unit (for example, a PLL circuit) 272. Also, the system clock generating unit 271 uses a GPS clock 280 extracted from a GPS radio wave received from a GPS signal receiver, to generate a 27 MHz system clock using the PLL unit 272. The generated system clock CLK(R) is sent to the receiving unit 200, and used in the counter value of a receiving time stamp counter unit 231 that is described later.

The receiving unit 200 includes a double buffer 210, a flag extraction unit 220, a receiving buffer control unit 230, and a clock adjustment unit 240. MPEG-2 TTS packets that have been input to the receiving unit 200 via the transmission path are stored in the double buffer 210. By providing a double storage area (receiving buffer) in the double buffer, it is possible to suppress jitter due to PCR by controlling writing to and reading from the receiving buffer, and it is possible to achieve stable transmission and reception of packets.

When flag information is included in the MPEG-2 TS packet 151 (the start of the packet begins with "37 h"), the flag extraction unit 220 changes it to 47 h (fixed value in the packet front). Also, the flag extraction unit 220 transmits the MPEG-2 TS packets 150 to the transmission path.

The receiving buffer control unit 230 includes the receiving time stamp counter unit 231 and a time stamp value comparison unit 232.

The receiving time stamp counter unit 231 generates a time stamp value that identifies the timing that a received MPEG-2 TTS packet was read from the double buffer 210 using a system clock CLK(R) 250 generated by the system clock generating unit 271.

The time stamp value comparison unit 232 compares the value of the time stamp 155 of each of the packets stored in the double buffer 210 with the time stamp values output by the receiving time stamp counter unit 231.

If the result of the comparison by the time stamp value comparison unit 232 is that an MPEG-2 TTS packet for which both time stamp values correspond (for example, they are the same) is identified, the receiving buffer control unit 230 removes the time stamp 155, and reads the packet as an MPEG-2 TS packet 151. The receiving buffer control unit 230 sends the MPEG-2 TS packet 151 that has been read to the flag extraction unit 220. At this time, in the case of packets for which the first byte at the beginning of the MPEG-2 TS packet is 37 h, the receiving buffer control unit 230 sends the MPEG-2 TTS packets to a counter value comparison unit 242 as packets having flag information every predetermined number of packets (for example, every 32 packets).

The clock adjustment unit 240 includes a transmission clock generation unit 241, and the counter value comparison unit 242. The transmission clock generation unit 241 is, for example, a voltage controlled crystal oscillator (VCXO) that generates a clock of a specific frequency in accordance with the applied voltage. Also, the transmission clock generation unit 241 outputs an output clock 260 synchronized with the transmission of the MPEG-2 TS packets 150.

The counter value comparison unit 242 compares the interval for applying a flag (the expected count value of the clock if no packets are lost) with the count value measured (counted) on the clock generated by the voltage controlled crystal oscillator (VCXO) in the transmission clock generation unit 241, and identifies differences.

Figure 3:
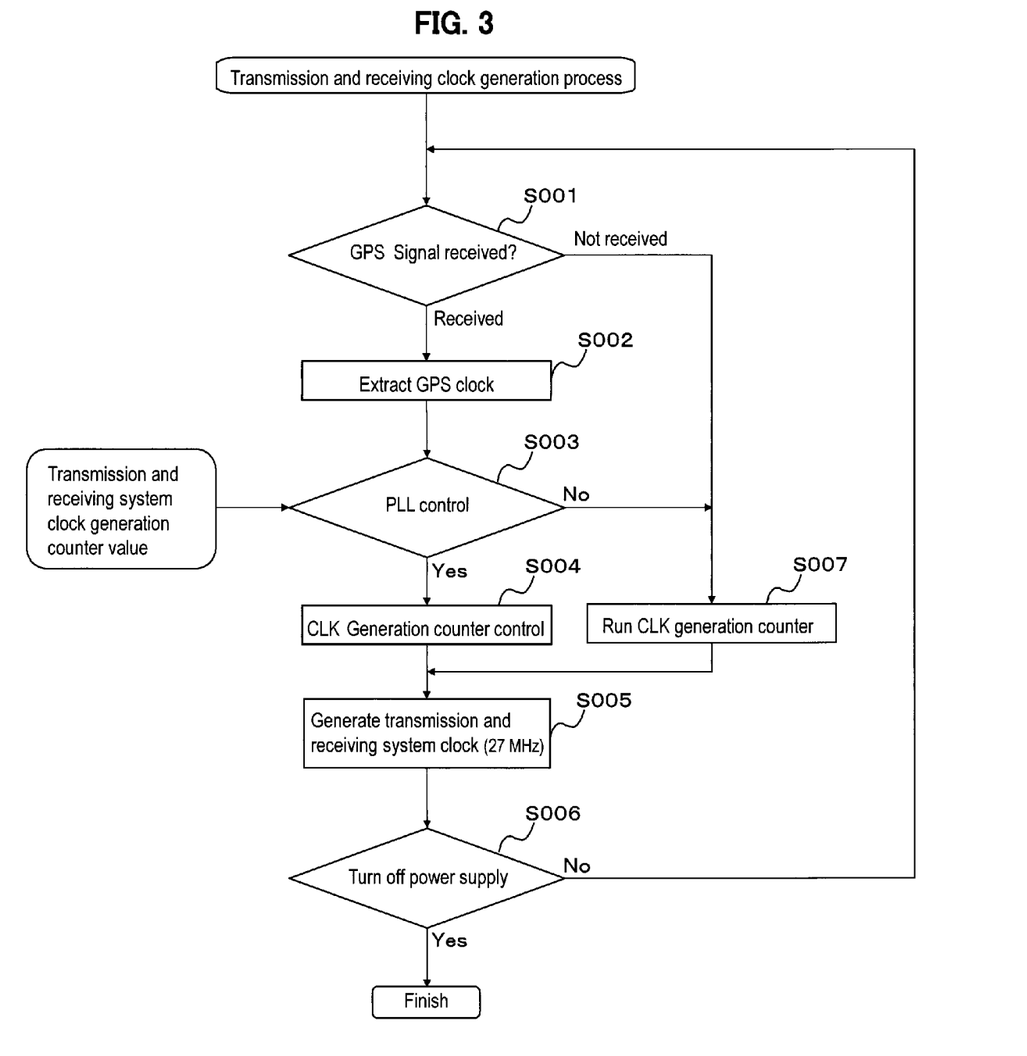
FIG. 3 is a view illustrating the process flow of a GPS clock generating process.

FIG. 3 illustrates the operational flow of the transmission and receiving clock generation processes in the present embodiment. The transmission and receiving clock generation processes are started when the transmission device 10 and the receiving device 20 are started up.

First, the system clock generating units 161, 271 determine whether or not a GPS signal receiver (not illustrated in the drawings) has received a GPS signal (step S001). Specifically, the system clock generating units 161, 271 inquire regarding the status of reception of GPS signals by the GPS signal receiver. If a GPS signal has not been received, the system clock generating units 161, 271 proceed to the process at step S007 which is described later.

If a GPS signal has been received ("Received" at step S001), the system clock generating units 161, 271 extract the GPS clock (step S002). Specifically, the system clock generating units 161, 271 extract the GPS clock from the received GPS signal.

Then, the PLL unit 162 determines whether PLL control is necessary by reference to the transmission and receiving system clock generation counter value (step S003), and if PLL control is to be carried out, PLL unit 162 controls the transmission and receiving system clock generation counter (step S004). Then, the PLL unit 162 generates a phase adjusted 27 MHz transmission and receiving system clock (step S005).

The system clock generating units 161, 271 of the transmission device 10 or the receiving device 20 determine whether the power supply of the transmission device 10 or the receiving device 20 is turned off or not (step S006). If the power supply is turned off, the system clock generating units 161, 271 terminate the transmission and receiving clock generation process, and if the power supply is not turned off control is returned to step S001.

If the system clock generating units 161, 271 have not received a GPS signal ("Not received" at step S001), or if PLL control is not carried out ("No" at step S003), the clock generation counter is allowed to run, and a 27 MHz transmission and receiving system clock is generated (step S007).

This completes the process flow of the transmission and receiving clock generation process. From the transmission and receiving clock generation process, the system clock can be generated using the GPS clock.

Figure 4:
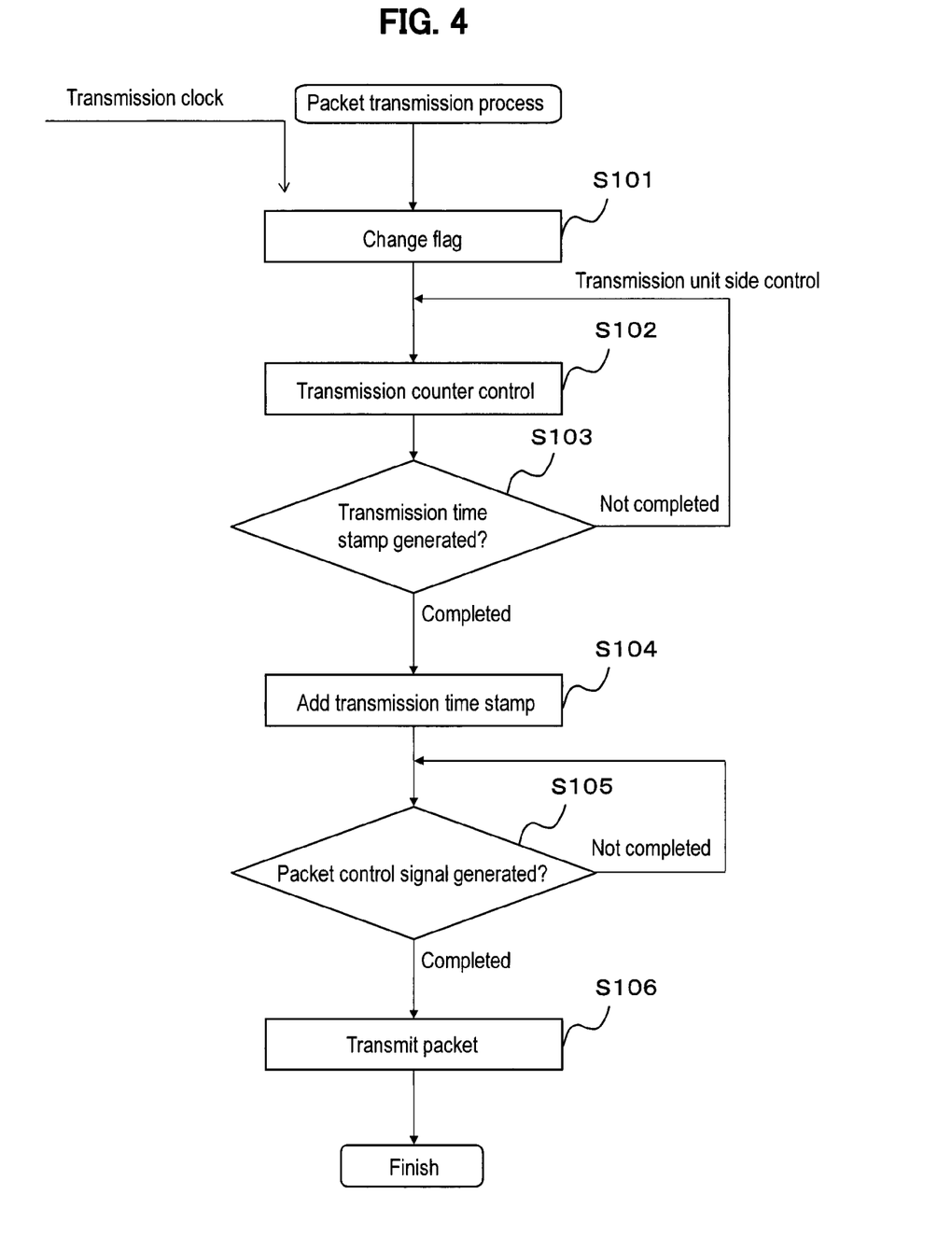
FIG. 4 is a view illustrating the process flow of a packet transmission process.

FIG. 4 illustrates the operational flow of the packet transmission process in the present embodiment. The packet transmission process is started when a transmitted MPEG-2 TS packet is received after the transmission device 10 is started up.

The flag processing unit 110 changes the flag (step S101). Specifically, the flag processing unit 110 changes the first byte of the MPEG-2 TS packet lead position as a flag from 47 h (fixed value in the packet front) to 37 h at a predetermined interval (for example, every 32 bytes) in the forward reproduction direction of one or a plurality of MPEG-2 TS packets, and transmits it to the transmission time stamp generation unit as an MPEG-2 TS packet 151.

Then, the time stamp application unit 120 carries out transmission counter control (step S102). Specifically, the time stamp application unit 120 identifies the transmission timing of each MPEG-2 TS packet in accordance with the value of the counter generated by the transmission time stamp counter unit 130.

Then, the time stamp application unit 120 determines whether or not generation of the transmission time stamp is completed (step S103). Specifically, the time stamp application unit 120 determines whether or not the time stamp generated by the transmission time stamp counter unit 130 has been generated, and if it has not been generated control is returned to step S102.

If the transmission time stamp has been generated ("Completed" at step S103), the time stamp application unit 120 applies the transmission time stamp (step S104). Specifically, the time stamp application unit 120 applies the time stamp 155 to the MPEG-2 TS packet 151 that is to be transmitted.

Then, the time stamp application unit 120 waits until a packet control signal has been generated (step S105), and when the packet control signal has been generated, the packet is transmitted (step S106).

This completes the process flow of the packet transmission process. As a result of the packet transmission process, the flag is applied to the MPEG-2 TS packets to be transmitted at the predetermined interval (for example, every 32 packets) in the forward reproduction direction, the time stamp is added, and the packets can be transmitted.

Figure 5:
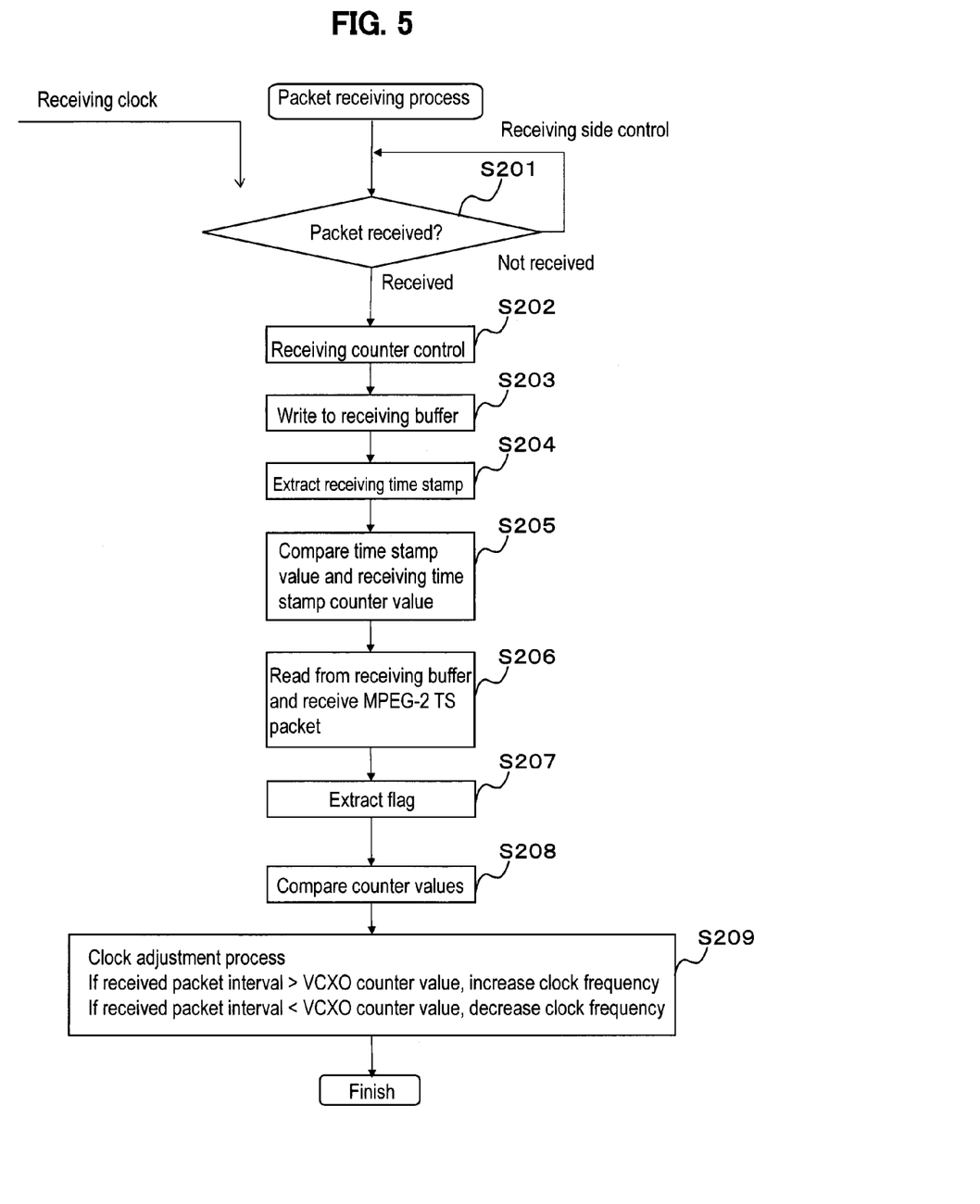
FIG. 5 is a view illustrating the process flow of a packet receiving process.

FIG. 5 illustrates the operational flow of the packet receiving process in the present embodiment. The packet receiving process is started when the receiving device 20 is started up.

First, the receiving buffer control unit 230 determines whether or not a packet has been received (step S201). Specifically, the receiving buffer control unit 230 determines whether or not an MPEG-2 TTS packet has been received via the transmission path. If a packet has not been received, the receiving buffer control unit 230 returns control to step S201.

If a packet has been received ("Yes" at step S201), the receiving buffer control unit 230 carries out the packet receiving counter control (step S202). Specifically, the receiving buffer control unit 230 arranges the received MPEG-2 TTS packets in the order of the value of the time stamp 155.

Then, the receiving buffer control unit 230 writes to the receiving buffer (step S203). Specifically, the receiving buffer control unit 230 writes the MPEG-2 TTS packets in their arranged order to the double buffer 210.

Then, the time stamp value comparison unit 232 extracts the received time stamps (step S204). Specifically, the time stamp value comparison unit 232 obtains the values of the time stamps 155 from the MPEG-2 TTS packets stored in the double buffer 210.

Then, the time stamp value comparison unit 232 compares the time stamp value and the received counter value (step S205). Specifically, the time stamp value comparison unit 232 compares the value of the time stamp obtained in step S204 and the value of the received time stamp counter generated by the receiving time stamp counter unit 231.

Then, the receiving buffer control unit 230 reads the receiving buffer, and extracts the MPEG-2 TS packets (step S206). If the result of the comparison in step S205 is that the time stamp value is the same as the receiving time stamp counter value generated by the receiving time stamp counter unit 231, the receiving buffer control unit 230 reads the MPEG-2 TS packet 151 of the MPEG-2 TTS packet, and passes it to the flag extraction unit 220. At this time, in the case of packets for which the first byte at the beginning of the MPEG-2 TS packet is 37 h, the receiving buffer control unit 230 sends the MPEG-2 TTS packets to a counter value comparison unit 242 as packets having flag information every predetermined number of packets (for example, every 32 packets).

Then the flag extraction unit 220 extracts the flag (step S207). Specifically, for MPEG-2 TS packets 151 received from the receiving buffer control unit 230 in which the first byte at the beginning is 37 h, the flag extraction unit 220 rewrites it to 47 h (fixed value in the packet front), and transmits the MPEG-2 TS packet 150 to the transmission path.

The counter value comparison unit 242 compares the counter values (step S208). Specifically, the counter value comparison unit 242 compares the interval for applying the flag (the expected count value of the clock every 32 packets if no packets are lost) with the count value measured (counted) by the clock generated by the voltage controlled crystal oscillator (VCXO) in the transmission clock generation unit 241 between flags of the packets actually received, and identifies differences.

Then the counter value comparison unit 242 carries out the clock adjustment process for the transmission clock generation unit 241 (step S209). Specifically, if the count value between flags of the received packets is greater than the count value of the clock generated by the VCXO, the counter value comparison unit 242 increases the frequency of the transmission clock generation unit 241 in accordance with the magnitude of the difference, in other words instructs that the frequency be increased (increase the applied voltage). Alternatively, if the count value between flags of the received packets is less than the count value of the clock generated by the VCXO, the counter value comparison unit 242 reduces the frequency of the transmission clock generation unit 241 in accordance with the magnitude of the difference, in other words instructs that the frequency be decreased (reduce the applied voltage).

This completes the process flow of the packet receiving process. According to the packet receiving process, the receiving device 20 can adjust the frequency of the VCXO clock in accordance with the discrepancy generated between the expected receiving interval (clock) between flags in the packets and the VCXO clock, which is the output clock actually generated by the transmission clock generation unit 241.

Figure 6:
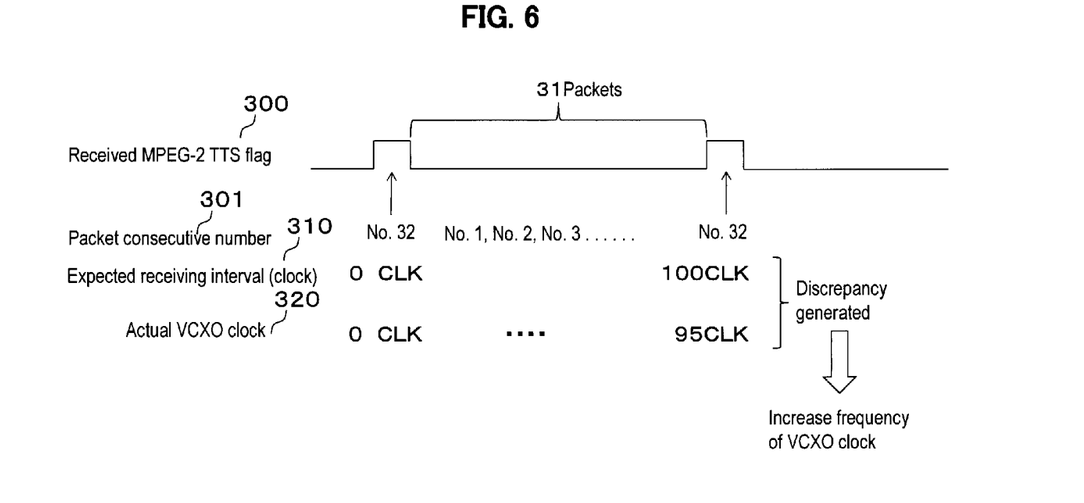
FIG. 6 is a view illustrating an example of increasing the clock frequency of the clock adjustment process.

FIG. 6 illustrates an example of clock adjustment in the packet receiving process. In this example it is necessary to increase the frequency of the VCXO clock. A flag 300 of the received MPEG-2 TTS packets is positive every 32 packets. If a packet sequential number 301 is applied in the forward reproduction direction from a packet whose flag 300 is positive, then the 32nd packet will have a positive flag 300.

Here, if it is assumed that the clock generated by the packet corresponding to the 32nd packet sequential number 301 is the 100th clock from the packet whose flag 300 is positive, then if the actually generated VCXO clock 320 is the 95th clock, a discrepancy occurs in which the VCXO clock is slow. This discrepancy can be eliminated by increasing the frequency of the VCXO clock and adjusting the delay so that the generated clock is 100. Therefore, the counter value comparison unit 242 issues an instruction to the transmission clock generation unit 241 to increase the frequency.

Figure 7:
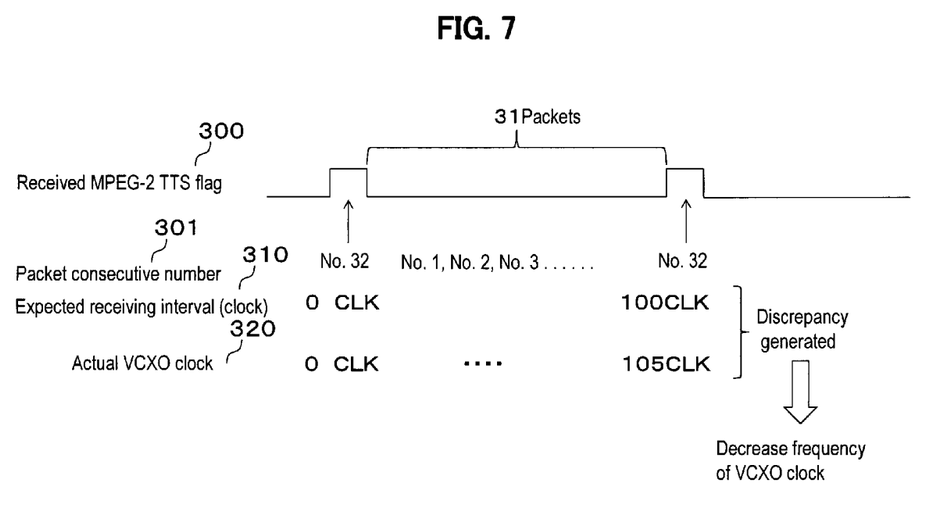
FIG. 7 is a view illustrating an example of reducing the clock frequency of the clock adjustment process.

FIG. 7 illustrates an example of clock adjustment in the packet receiving process. In this example it is necessary to decrease the frequency of the VCXO clock. A flag 300 of the received MPEG-2 TTS packets is positive every 32 packets. If a packet sequential number 301 is applied in the forward direction from a packet whose flag 300 is positive, then the 32nd packet will have a positive flag 300.

Here, if it is assumed that the clock generated by the packet corresponding to the 32nd packet sequential number 301 is the 100th clock from the packet whose flag 300 is positive, then if the actually generated VCXO clock 320 is the 105th clock, a discrepancy occurs in which the VCXO clock is advanced. This discrepancy can be eliminated by reducing the frequency of the VCXO clock and adjusting the advancement so that the generated clock is 100. Therefore, the counter value comparison unit 242 issues an instruction to the transmission clock generation unit 241 to reduce the frequency.

This completes the description of the communication device that includes the transmission device 10 and the receiving device 20 that apply the first embodiment of the present invention. According to the first embodiment, in the transmission device 10 as communication device, the flag is added, and in the receiving device 20, the output clock can be adjusted in accordance with the flag interval, so it is possible to provide communication technology in which it is easy to maintain clock synchronization accuracy, even for a network where packet loss can easily occur. In other words, even when a packet is lost during transmission, it is possible to adjust the shift in the clock, so it is possible to smoothly reproduce video.

The present invention is not limited to the first embodiment as described above. Various modifications can be made to the first embodiment within the technical scope of the present invention. For example, in the first embodiment as described above, it was envisaged that the transmission device 10 and the receiving device 20 are different devices, but this is not a limitation, and they can be realized in the same device.

Figure 8:
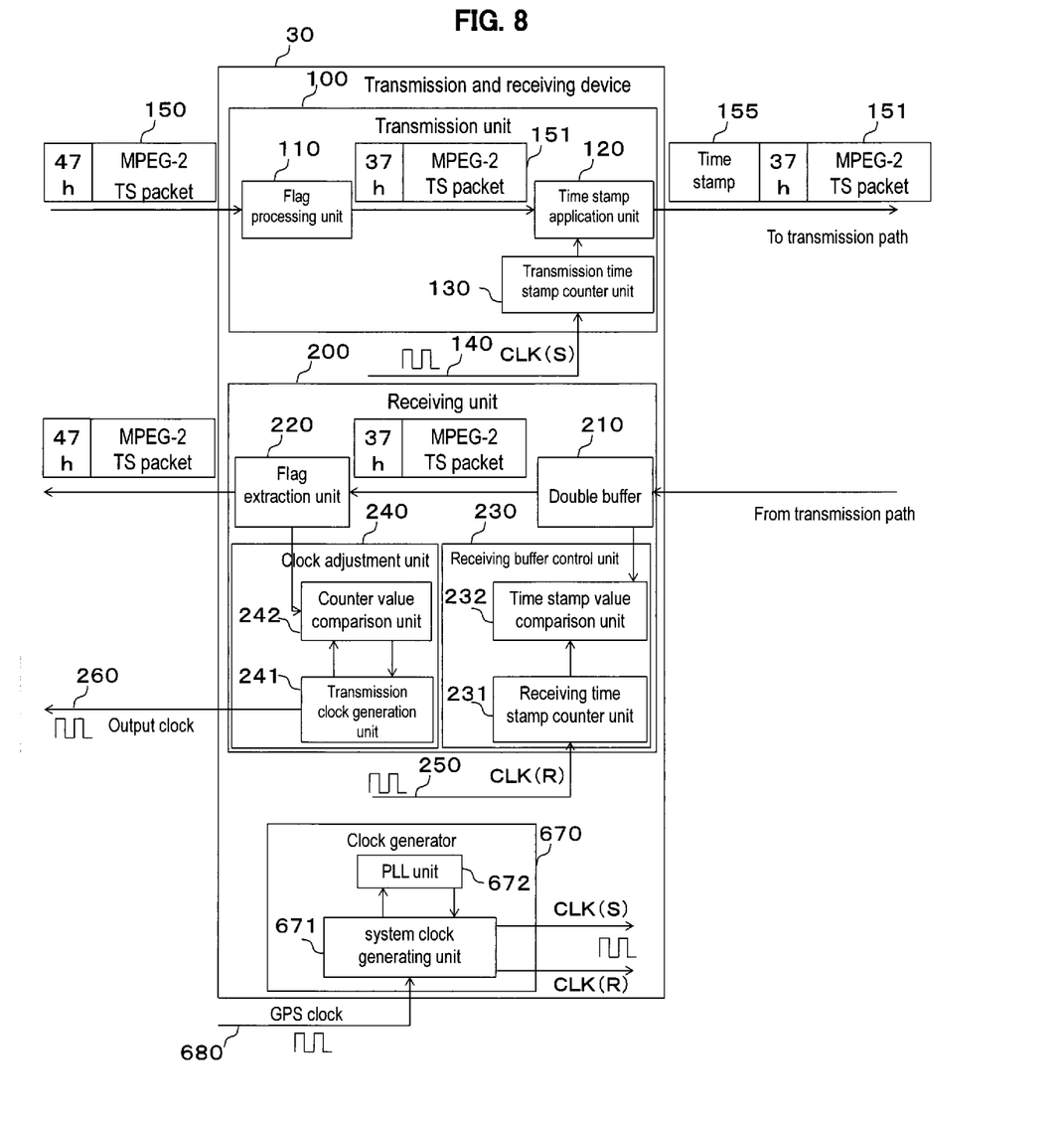
FIG. 8 is a block diagram of a transmission and receiving device according to a second embodiment of the present invention.

FIG. 8 illustrates an example of a transmission and receiving device 30 according to a second embodiment of this type. The transmission and receiving device 30 includes a transmission unit that is the same as the transmission unit 100 included in the transmission device 10, and a receiving unit that is the same as the receiving unit 200 included in the receiving device 20. Also, the transmission and receiving device 30 includes a clock generator 670 that includes a PLL unit 672 and a system clock generating unit 671 that output the CLK(S) and CLK(R) clocks to the transmission unit 100 and the receiving unit 200 respectively, using a GPS clock 680 received from outside.

With a transmission and receiving device 30 of this type, it is possible for transmission and receiving devices 30 to send to and receive from each other, so it is possible to establish a communication facility that easily distributes video highly accurately, such as a wired broadcast station or the like.

Figure 9:
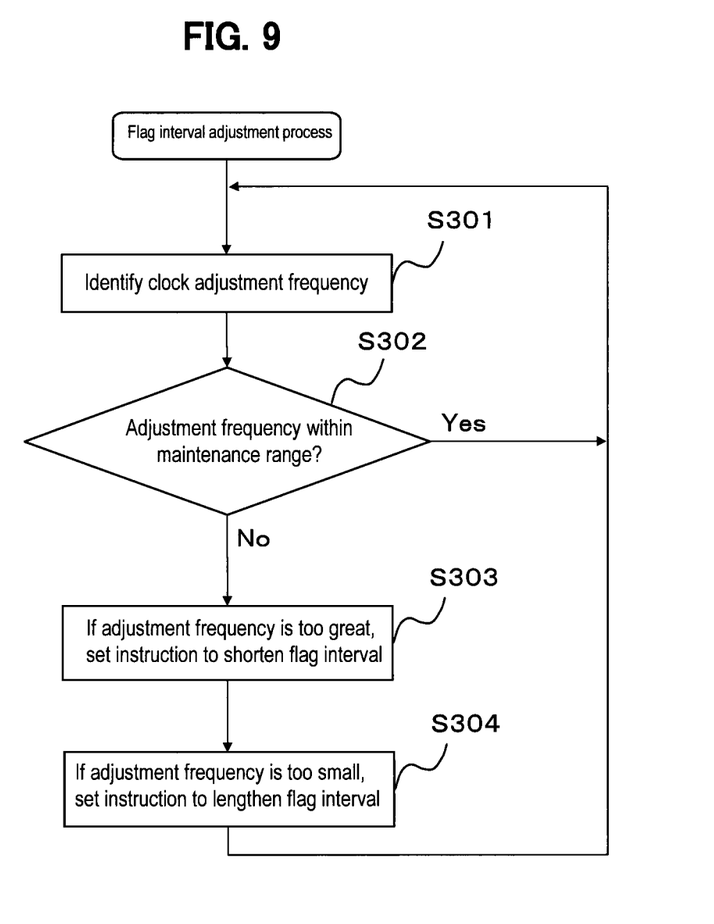
FIG. 9 is a view illustrating the process flow of a flag interval adjustment process according to a third embodiment of the present invention.

Also, FIG. 9 illustrates the process flow for a flag interval adjustment process in which the clock adjustment unit 240 of the receiving unit 200 provides feedback instructions to the flag processing unit 110 to optimize the packet interval for setting the flag. The clock adjustment unit 240 sends instructions to the flag processing unit 110 via the transmission path in the first embodiment or via an internal bus or the like in the second embodiment.

First, the clock adjustment unit 240 identifies the frequency of adjustment of the clock (step S301). Specifically, the clock adjustment unit 240 calculates the number of times in a predetermined period of time that the clock adjustment process is carried out in step S209 of the packet receiving process, to determine the frequency of implementation per unit time.

Then, the clock adjustment unit 240 determines whether or not the determined frequency of adjustment is within a maintenance range (step S302). Specifically, the clock adjustment unit 240 determines whether or not the frequency of implementation determined in step S301 is contained between a predetermined upper limit value and a lower limit value. If it is within the maintenance range, the clock adjustment unit 240 returns control to step S301.

If it is not within the maintenance range ("No" in step S302), if the frequency of adjustment is too large the clock adjustment unit 240 instructs the flag processing unit 110 to set the flag interval shorter (step S303). Specifically, when the frequency of implementation is greater than a predetermined upper limit value, an instruction is given to shorten the interval for applying flags by a specific number of packets (for example, shorten the flag interval by two packets), in order to carry out the adjustment at a shorter interval, as a discrepancy can easily occur in the clock generated by the VCXO.

If the frequency of adjustment is too low, the clock adjustment unit 240 instructs the flag processing unit 110 to set the flag interval longer (step S304). Specifically, when the frequency of implementation is less than a predetermined lower limit value, an instruction is given to lengthen the interval for applying flags by a specific number of packets (for example, lengthen the flag interval by two packets), so that the clock generated by the VCXO is in a state close to the proper state and the accuracy can be maintained even by adjusting at a longer interval. Then the clock adjustment unit 240 returns control to step S301.

This completes the process flow of the flag interval adjustment process. By carrying out the flag interval adjustment process, it is possible to adjust the interval at which the flag is applied to the MPEG-2 TS packets, so when the operation is stable it is possible to increase the flag interval and eliminate wasteful synchronization processes, and when the operation is unstable it is possible to shorten the flag interval to enable a fine synchronization process.

In the embodiments as described above, in the flag process carried out by the flag processing unit 110 the expression positive was used with the meaning of raising a flag, and negative was used with the meaning of lowering a flag, but this is not a limitation. For example, information in a predetermined offset position on the packet may be changed to the flag information, and information in a predetermined offset position on the packet may be deleted. Also, information in a predetermined offset position may be processed by rearranging or the like, in accordance with a predetermined rule.

Also, the technical elements of the embodiments as described above may be applied independently, or they may be applied separately as a plurality of parts such as a program component or a hardware component.

This completes the description of the present invention based on the embodiments.

REFERENCE NUMERALS

10 Transmission device
20 Receiving device
30 Transmission and receiving device
100 Transmission unit
110 Flag processing unit
120 Time stamp application unit
130 Transmission time stamp counter unit
140 CLK(S)
150 MPEG-2 TS packet
151 MPEG-2 TS packet
155 Time stamp
160 Clock generator
161 System clock generating unit
162 PLL unit
180 GPS clock
200 Receiving unit
210 Double buffer
220 Flag extraction unit
230 Receiving buffer control unit
231 Receiving time stamp counter unit
232 Time stamp value comparison unit
240 Clock adjustment unit
241 Transmission clock generation unit
242 Counter value comparison unit
250 CLK(R)
260 Output clock
270 Clock generator 271 System clock generating unit
272 PLL unit
280 GPS clock
670 Clock generator
671 System clock generating unit
672 PLL unit
680 GPS clock

What is claimed is:

1. A communication device, comprising:
a receiving device including a transmission clock generation unit having an output clock frequency that can be variably adjusted,
a receiving buffer control unit that determines whether one or a plurality of MPEG-2 TTS packets have been received, carries out packet receiving counter control when the one or a plurality of MPEG-2 TTS packets have been received to arrange the received one or a plurality of MPEG-2 TTS packets in order of time stamp value, and writes the received one or a plurality of MPEG-2 TTS packets in order of time stamp value to a receiving buffer, and
a clock adjustment unit that acquires from among the one or a plurality of MPEG-2 TTS packets to which a time stamp value has been applied, a packet to which a time stamp calculated using a GPS clock has been applied, and if the packet includes predetermined flag information, adjusts a clock frequency output by the transmission clock generation unit in accordance with a difference, calculated by the clock adjustment unit, between an actual value of an interval between the flag information in the received one or a plurality of MPEG-2 TTS packets and an expected value of the interval corresponding to a clock counter value output by the transmission clock generation unit;
wherein the receiving buffer control unit reads the receiving buffer and extracts one or a plurality of MPEG-2 TS packets, based on a result of comparing the time stamp value and the clock counter value.

2. The communication device according to claim 1, wherein
when the expected value of the interval is greater than the clock counter value output by the transmission clock generation unit, the clock adjustment unit increases the clock frequency output by the transmission clock generation unit, and when the expected value of the interval is less than the clock counter value, the clock adjustment unit reduces the clock frequency output by the transmission clock generation unit.

3. A communication device, comprising:
a transmission unit including a flag processing unit that, upon receipt of one or a plurality of MPEG-2 TS packets in an MPEG-2 TS generated in accordance with an asynchronous clock outside of the communication device, applies flag information to the packets at a predetermined interval in the forward reproduction direction of the packets, and
a time stamp application unit that generates an MPEG-2 TTS packet by applying a time stamp value calculated using a GPS clock to each of the one or a plurality of MPEG-2 TS packets including an MPEG-2 TS packet having the flag information applied by the flag processing unit, and transmits the MPEG-2 TTS packet to a transmission path,
wherein the MPEG-2 TS does not synchronize the GPS clock or a system clock of the communication device, and
a receiving unit including
a transmission clock generation unit having an output clock frequency that can be variably adjusted,
a receiving buffer control unit that determines whether one or a plurality of MPEG-2 TTS packets have been received, carries out packet receiving counter control when the one or a plurality of MPEG-2 TTS packets have been received to arrange the received one or a plurality of MPEG-2 TTS packets in order of time stamp value, and writes the received one or a plurality of MPEG-2 TTS packets in order of time stamp value to a receiving buffer, and
a clock adjustment unit that acquires from among the one or a plurality of the MPEG-2 TTS packets, a packet to which a time stamp calculated using a GPS clock has been applied, and if the packet includes the flag information, adjusts a clock frequency output by the transmission clock generation unit in accordance with a difference, calculated by the clock adjustment unit, between an actual value of an interval between the flag information in the one or a plurality of MPEG-2 TTS packets and an expected value of the interval corresponding to a clock counter value output by the transmission clock generation unit.

4. The communication device according to claim 3, further comprising
a flag interval adjustment unit that, when a frequency of adjustment of the clock frequency by the clock adjustment unit is greater than a predetermined frequency, shortens the interval of applying the flag information by the flag processing unit, and when the frequency of adjustment is lower than a predetermined frequency, lengthens the interval of applying the flag information by the flag processing unit.

5. A communication method using a computer,
the computer including
a transmission clock generation unit having an output clock frequency that can be variably adjusted; and the computer executing
a receiving buffer control step of determining whether one or a plurality of MPEG-2 TTS packets generated by an asynchronous clock outside of the communication device have been received, carrying out packet receiving counter control when the one or a plurality of MPEG-2 TTS packets have been received to arrange the received one or a plurality of MPEG-2 TTS packets in order of time stamp value, and writing the received one or a plurality of MPEG-2 TTS packets in order of time stamp value to a receiving buffer, and
a clock adjustment step of acquiring from among the one or a plurality of MPEG-2 TTS packets to which a time stamp value has been applied, a packet to which a time stamp calculated using a GPS clock has been applied, and if the packet includes predetermined flag information, adjusting a clock frequency output by the transmission clock generation unit in accordance with a difference, calculated by the clock adjustment unit, between an actual value of an interval between the flag information in the one or a plurality of MPEG-2 TTS packets and an expected value of the interval corresponding to a clock counter value output by the transmission clock generation unit.

* * * * *